United States Patent Office 3,424,885
Patented Jan. 28, 1969

3,424,885
METHOD OF PRODUCING TRANSVERSE SEAL-INGS OF COLLAPSIBLE TUBE-SHAPED CONTAINERS BY MEANS OF PRESSURE JAWS AND HEAT, AND MEANS FOR CARRYING OUT SAID METHOD
Karl Garney, Stuvsta, and Gunnar Winkler, Bromma, Sweden, assignors to Arenco Aktiebolag, Stockholm-Vallingby, Sweden
Filed Oct. 17, 1966, Ser. No. 587,082
Claims priority, application Sweden, Nov. 1, 1965, 14,054/65
U.S. Cl. 219—10.53    3 Claims
Int. Cl. B23k 13/02

ABSTRACT OF THE DISCLOSURE

An apparatus for transversely sealing collapsibel tubular containers having a laminated wall with an inner layer of plastic having low dielectric loss capable of being melted and a metal layer outside the plastic layer with a longitudinal plastic welding seam has a pair of pressure jaws one of which carries a tubular conductor connected to a high frequency impulse generator and it is located on the side of the container opposite the longitudinal seam. A sensing means is utilized to sense the position of the longitudinal seam and to rotate the container so that the seam is opposite the jaw carrying the conductor.

---

Figure 1:
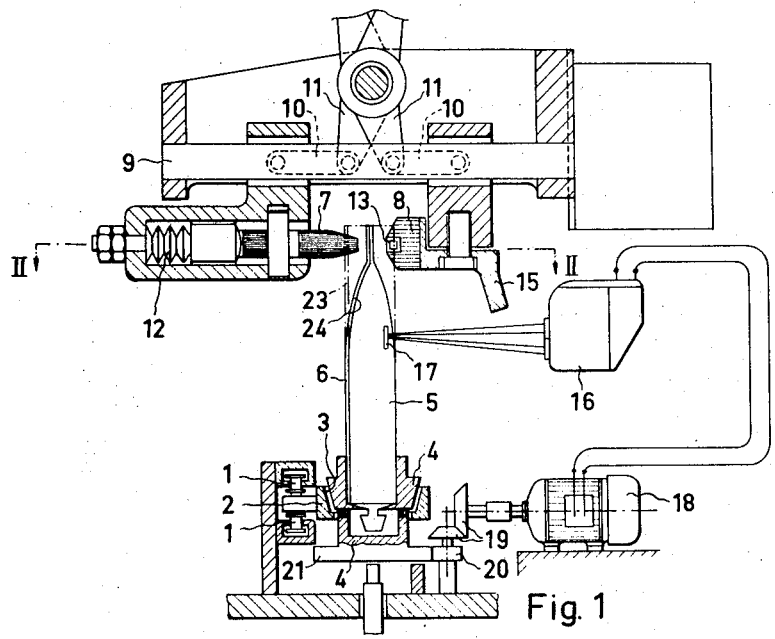

The present invention relates to an apparatus for making transverse seals on collapsible, tubular containers, using heat in conjunction with pressure jaws, such containers having a laminated wall comprising an inner layer of platsic capable of being melted by heat and having a low dielectric loss factor, and a layer of metal outside the plastic layer, and possibly a layer of paper and/or plastic outside said metal layer, the tubular containers being provided with a longitudinal plastic welding seam.

When sealing plastic containers it is previously known to generate the necessary heat by heating the plastic dielectrically. This method, however, cannot be adopted when the type of plastic used have a low dielectric loss factor, for instance polyethylene which due to its low cost, high mechanical strength, low permeability to gases and chemical stability is one of the most suitable materials for packaging purposes.

The art also recognises the use of so-called impulse-heated sealing jaws. One disadvantage with this method is that time taken to effect the seal is relatively long, despite the fact that the jaws are impulse heated. This disadavantage becomes more manifest in the case of containers provided with an outer heat-insulating layer of paper and/or plastic. Furthermore, due to the high temperature of the jaws, it is difficult to avoid discolouring the material, or causing other kinds of damage, such as melt marks, when the seal is being made.

Similarly, it is known when melting plastic material having a low dielectric loss factor to position a metal object adjacent to the plastic material and then to heat the metal object by induction heating, employing for that purpose a winding connected to a high frequency voltage source and positioned around the metal object, until the melting temperature of the plastic material has been reached. The application of induction heating for transverse sealing of containers provided with a laminated wall of the type mentioned above has, during experiments, been shown to present certain, specific problems. It has been shown that the greatest amount of heat acts along the longitudinal welding seam of the container, this seam normally comprising an overlapping joint and thus containing a double thickness of metal, whereby damage to the sealing region on the outer surface of the container cannot be avoided. Furthermore, the plastic material in the longitudinal welding seam outside the sealing region melts, firstly due to direct, inductive heating of the same and secondly owing to heat being conducted in the metal layer, from the sealing region, this latter inconvenience also occuring when heated pressure jaws are used. Consequently the result is a reduction in the strength of the weld and in many cases cracks appear in the joint, which is subjected to strong bending and traction strain during the sealing operation.

These disadvantages are avoided when adopting the apparatus according to the present invention, which is characterized in that the presure jaws are pressed against the container in such away that when a sealing region of the containers is pressed flat the longitudinal welding seam of each container abuts one of the jaws, whereafter a high frequency current of short duration is led to a conductor situated in a pressure surface of a second pressure jaw arranged on the opposite side of the container, so that the metal layers nearest the conductor are subjected to a high frequency field, which induces currents in these portions of the metal layers, heating these portions to such a temperature that the melting point of adjacent plastic layers is reached while portions of the metal layer more remote from the conductor, i.e. the metal layers outside the flattened sealing region, and possibly the outer metal layer in the longitudinal welding seam within the sealing region, are subjected to a weaker high-frequency field, insufficient to heat the latter portions of the metal layers to such a temperature that the melting temperature of adjacent plastic layers is reached. The invention is thus based on the use of the magnetic field diminishing outwards from the conductor which is through passed by a high frequency current, to prevent, in particular, the longitudinal welding seam outside the sealing region from being actuated upon during the sealing operation. In spite of the fact that, in the sealing region, only one or possibly two twin plastic and/or paper layers separate the outermost metal layers in the welding seam from the next, internally situated metal layer the surprising effect has been observed that the heating of the outermost metal layer is substantially reduced. This effect is particularly manifest if the jaws are brought together so that the folds of the walls of the container occurring at the ends of the sealing region are not pressed flat until the plastic melts. Complete flattening of the folds before they are heated requires the application of high pressure forces but such flattening can be achieved automatically if the jaws, exerting but a moderate force are brought resiliently together in the region of the folds when the material of the folds softens and melts, under the application of heat.

The invention also relates to an apparatus characterized in that the containers are positioned in holders rotatably mounted on a conveyor belt around the centre axis of the containers such holders being capable of being adjusted by means of a drive device which is controlled by an arrangement for indicating the position of the longitudinal welding seam of the containers, in a position of rotation in which the welding seams are pointed in a specific direction, in addition to which the pressure jaws are arranged to move in a direction determined by the position of adjustment of the containers, this direction being such that when the sealing region is pressed flat the longitudinal welding seam does not come into contact with the jaw provided with the conductor.

Figure 2:
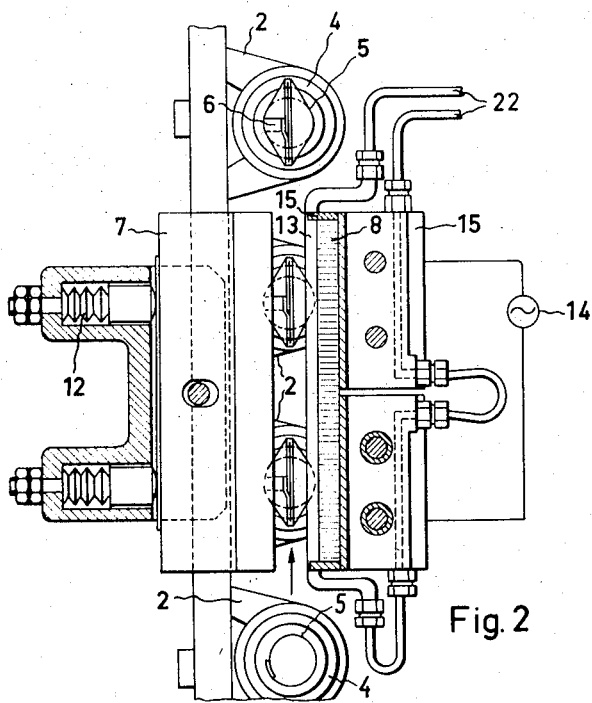

The invention will be more closely described with reference to the accompanying, diagrammatic drawing which illustrates an embodiment of an apparatus according to the invention, FIG. 1 showing a vertical section through the apparatus and FIG. 2 a horizontal sectional view taken along the line II—II in FIG. 1, partly in section.

The apparatus has an endless belt comprising two chains 1, the chains running over guides and drive wheels, not shown. Mounted in uniform spaced relation on the chains 1 are holders 2, each provided with a cylindrical recess 3 in which a cylindrical insert member 4 is rotatably mounted in each holder 2. Each insert 4 is provided with a recess in which a container in the form of a tube 5 is mounted. The tubes are provided with a longitudinal welding seam 6 and the walls comprise laminated material, namely an inner layer of plastic having low dielectric loss factor, a metal layer positioned outside said plastic layer and an outer layer of paper and plastic.

Level with the upper ends of the tubes are two pressure jaws 7 and 8, displacably mounted on rigid rods 9. The pressure jaws are actuated by means of links 10 which connect the jaws with pivotable link arms 11 mounted around a stationary shaft, the link arms being driven by means of a drive means, not shown. The jaw 7 comprises an insulating material and is mounted resiliently against the action of cup springs 12. The jaw 8 is provided with an annular conductor 13 made of copper, and having square or rectangular cross section. The conductor 13 is connected to a high frequency voltage source 14 via connecting blocks 15, connected to the conductor, and current regulating means, not shown.

The chains 1 are driven stepwise in such a way that two tubes 5 at a time are advanced to the jaws 7 and 8, which extend in the direction of the conveyor belt so that the two tubes can be sealed simultaneously. Before sealing is effected the tubes 5 must be adjusted so that the longitudinal welding seam 6 is turned towards the jaw 7. For this purpose an indicating means 16 is arranged for each tube, sensing optically the position of a mark 17 on the tube and controlling a motor 18 which, via a gear 19 and a drive wheel 20, rotates the holder 2 and the tube 5 until the mark 17 is indicated by the device 16. The mark 17 on the tubes is so positioned with respect to the welding seam 6 that the tubes are always positioned by the indicating means 16 so that the welding seam 6 faces the jaw 7. The wheel 20 of each drive means is, furthermore, so positioned in the frame of the machine that when the conveyor belt is stopped it comes into frictional engagement with a friction surface 21 on the holder 2 at the station where sealing is effected. Naturally, the holders can also be caused to rotate at a previous station. Cooling of the conductor 13 is effected by the ends of the conductor being connected to a cooling water conduit 22.

Prior to being sealed the tubes 5 have the shape indicated by the phantom line 23 whereas after the sealing region has been flattened they take the shape indicated by the full line 24. The conductor 13 and connecting blocks 15 form a single turn coil, the outer surface of which facing the tube abuts the wall of the tube during the flattening operation. The jaw 7 is applied to the opposite side of the tube at a pressure determined by springs 12, the pressure being so adapted that, prior to the sealing operation, the end of the tube is pressed substantially completely flat. The complete flattening of the sealing region is then accomplished when the conductor 13 is connected to the voltage source 14 and the plastic in the wall of the tube is heated to softening temperature. During the first portion of the heating process the welding seam 6 is thus located at a somewhat greater distance from the conductor 13, and thus in a weaker magnetic field, than during the last portion of the heating process, which contributes towards the required reduced heating of the welding seam. The curved portion of the welding seam 6, below the sealing region, is located at such a distance from the conductor 13 and in so weak a magnetic field that no deleterious heating of this portion of the welding seam occurs.

What is claimed is:
1. An apparatus for making transverse seals on collapsible, tubular containers having a laminated wall comprising an inner layer of plastic having a low dielectric loss factor and capable of being melted by heat, a metal layer outside said plastic layer and a longitudinal plastic welding seam, the apparatus comprising; a conveyor, container supporting means rotatably mounted on said conveyor around a center axis of said containers, at least one drive means adapted to engage one of said holders in a sealing statin and rotate said holder, control means connected to said drive means and adapted to indicate reaching of a predetermined position of rotation of said container in relation to the machine frame and to interrupt rotation of said holder in said position of the container, a first pressure jaw facing that side of the container where said longitudinal welding seam is located, a second pressure jaw facing the opposite side of said container, means to press said jaws against said container, and an electric tubular conductor connected to a high frequency impulse generator in a pressure surface of said second jaw.

2. An apparatus for making transverse seals on collapsible, tubular containers having a laminated wall comprising an inner layer of plastic having a low dielectric loss factor and capable of being melted by heat, a metal layer outside said plastic layer, a layer of insulating material outside said metal layer, and a longitudinal plastic welding seam, the apparatus comprising; a conveyor, container supporting means rotatably mounted on said conveyor around a center axis of said containers, at least one drive means adapted to engage one of said holders in a sealing station and rotate said holder, control means connected to said drive means and adapted to indicate reaching of a predetermined position of rotation of said container in relation to the machine frame and to interrupt rotation of said holder in said position of the container, a first pressure jaw facing that side of the container where said longitudinal welding seam is located, a second pressure jaw facing the opposite side of said container, means to press said jaws against said container, and an electric tubular conductor connected to a high frequency impulse generator in a pressure surface of said second jaw.

3. An apparatus as in claim 2, wherein said tubular conductor has a square cross section and constitutes a portion of a single-turn coil the side of which comprising a portion of the outer circumference of the coil being situated in said pressure surface of said second jaw.

References Cited

UNITED STATES PATENTS

| 2,542,702 | 2/1951 | Prow | 219—10.53 |
| 2,818,483 | 12/1957 | Blume | 219—10.53 X |
| 2,920,173 | 1/1960 | Wastberg | 219—10.53 |

RICHARD M. WOOD, *Primary Examiner.*

L. H. BENDER, *Assistant Examiner.*

U.S. Cl. X.R.

156—272; 219—10.79